United States Patent
Demaj et al.

(10) Patent No.: US 10,929,724 B2
(45) Date of Patent: Feb. 23, 2021

(54) METHOD AND APPARATUS FOR MONITORING SCENE DETECTION

(71) Applicant: STMicroelectronics (Rousset) SAS, Rousset (FR)

(72) Inventors: Pierre Demaj, Nice (FR); Laurent Folliot, Gourdon (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 445 days.

(21) Appl. No.: 15/924,608

(22) Filed: Mar. 19, 2018

(65) Prior Publication Data
US 2018/0330203 A1    Nov. 15, 2018

(30) Foreign Application Priority Data
May 10, 2017    (FR) ........................ 1754080

(51) Int. Cl.
*G06K 9/62* (2006.01)
*G06K 9/00* (2006.01)

(52) U.S. Cl.
CPC ....... *G06K 9/6282* (2013.01); *G06K 9/00624* (2013.01); *G06K 9/6277* (2013.01); *G06K 9/6293* (2013.01)

(58) Field of Classification Search
None
See application file for complete search history.

(56) References Cited

U.S. PATENT DOCUMENTS

| 2009/0319451 | A1* | 12/2009 | Mirbach | G06K 9/6262 706/12 |
| 2012/0254100 | A1* | 10/2012 | Grokop | A61B 5/1123 706/52 |
| 2014/0304726 | A1* | 10/2014 | Hansen | H04N 21/2407 725/14 |
| 2016/0299923 | A1* | 10/2016 | Nefedov | G06F 16/2358 |
| 2018/0293441 | A1 | 10/2018 | Demaj et al. | |

FOREIGN PATENT DOCUMENTS

| FR | 3065098 A1 | 10/2019 |
| WO | 2005022090 A2 | 3/2005 |

OTHER PUBLICATIONS

Moore, A., "Clustering with Gaussian Mixtures", School of Computer Science, Carnegie Mellon University, https://www.autonlab.org/tutorials/gmm.html, 2004, 30 pages.
(Continued)

*Primary Examiner* — David Perlman
(74) *Attorney, Agent, or Firm* — Slater Matsil, LLP

(57) ABSTRACT

A method is provided for monitoring scene detection by an apparatus detecting scenes from among a set of possible reference scenes. It includes an assignment of an identifier to each reference scene, detection of scenes from among the set of possible reference scenes at successive instants of detection with the aid of at least one classification algorithm, and a sliding time filtering processing of these detected current scenes over a filtering window of size M, based on the identifier of each new detected current scene taken into account in the window and a confidence probability associated with this new detected current scene, the output of the filtering processing successively delivering filtered detected scenes.

24 Claims, 9 Drawing Sheets

(56) References Cited

OTHER PUBLICATIONS

Hoseini-Tabatabaei, S.A. et al., "A survey on Smartphone Based Systems for Opportunistic User Context Recognition", University of Surrey, ACM computing surveys, vol. 45, No. 3, Article27, Publication date: Jun. 29, 2013, 51 pages.

Kang, K. et al., "T-CNN: Tubelets with Convolutional Neural Networks for Object Detection from Videos", arXiv:1604.02532v3 [cs.CV], IEEE Transactions on Circuits and Systems for Video Technology, Aug. 23, 2016, 10 pages.

Hagan, M.T., et al., "Neural Network Design" 2nd Edition, Sep. 1, 2014, 1012 pages.

Ozcelik, P.M. et al., "A Template-Based Approach for Real-Time Speed-Limit-Sing Recognition on an Embedded System Using GPU Computing", Pattern Recognition Springer Berlin Heidelgerg, Sep. 22, 2010, 10 pages.

Phan, et al., "Recognition of Video Through Temporal Intergration", 2013 12th International Conference on Document Analysis and Recognition, Aug. 25, 2013, 6 pages.

Rakotomalala, R., "Arbres de Décision (Decision Trees)", Revue MODULAD, 2005, No. 33, pp. 163-187.

\* cited by examiner

| reference scene | identifier |
|---|---|
| BUS | 1 |
| RESTAURANT | 2 |
| BUREAU | 3 |
| TRAIN | 4 |

METHOD AND APPARATUS FOR MONITORING SCENE DETECTION

CROSS-REFERENCE TO RELATED APPLICATIONS

This application claims priority to French Application No. 1754080, filed on May 10, 2017, which application is hereby incorporated herein by reference.

TECHNICAL FIELD

Implementations and embodiments relate generally to an electronic apparatus, and, more particularly, to a method and apparatus for monitoring scene detection.

BACKGROUND

A scene is understood in a very broad sense as notably encompassing a scene characteristic of the environment in which the apparatus is located, whether the apparatus is carried by a user capable of movement, e.g. a mobile cellular phone, (scene of the "bus," "train," "restaurant," "office," etc. type), or the apparatus is a fixed object, whether connected or not connected (a radiator, for example, in a home automation application), the scene characteristic of the environment possibly being, for example, of the "wet room," "dry room," "day," "night," "shutters closed," "shutters open," etc. type.

A scene may also encompass a scene characteristic of an activity practiced by the bearer of the apparatus, e.g., a smart watch. Such a scene could then be, for example, "walking," "running," etc.

Although the invention may apply to any type of apparatus and to any type of scene, wireless communication apparatuses will now be referred to more specifically.

Some wireless communication apparatuses, e.g., some types of smartphones or tablets, are capable of scene detection, making it possible to determine the environment in which the phone or tablet user is located. This may thus make it possible for a third party, e.g., an advertiser or a cultural organization, for example, to send relevant information connected with the place where the user of the apparatus is located.

SUMMARY

Thus, for example, if the user is located at a given tourist site, they may thus be sent restaurant addresses in the vicinity of the place where they are located. Similarly, they may also be sent information relating to certain historic buildings that are located in the vicinity of the place where they are located.

Scene detection is notably understood to mean a discrimination of the scene in which the wireless communication apparatus is located. Several known solutions exist for detecting (discriminating) a scene. These solutions use, for example, one or more dedicated sensors generally associated with a specific algorithm.

These sensors may be environmental measurement sensors, i.e., notably any type of sensor capable of supplying information on the environment in which the wireless communication apparatus is located, including, for example, spatiotemporal characteristics of the environment of the apparatus, e.g., the temporally frozen or not frozen character of the environment, the speed of evolution of spatiotemporal change in the environment (based on detecting the movement of the apparatus) and/or sound and/or spatial and/or visual characteristics of this environment, e.g., the noise level of the environment and/or the altitude and/or the brightness level of the environment (from, for example, sensors such as barometers, proximity sensors, optical sensors, etc.).

These sensors may be used to give, for example, an indication of the spatial orientation of the apparatus, e.g., the gyroscope, so as to rotate the display on the screen of the apparatus.

However, in a context where the apparatus is constantly powered up (Always-On) and where the battery life is an important criterion, these environmental sensors are advantageously used for scene detection.

This is a multimodal approach. And, in this case, an example of a specific algorithm may be an algorithm implementing a binary decision tree on the basis of descriptors or attributes resulting from particular processing (e.g., filtering) on the raw data from the sensors. These attributes may be, for example, means, energy values, variances, etc.

Algorithms implementing a decision tree are well known to the person skilled in the art.

The latter may, for example, refer for all useful purposes notably to the article by Syed Amir Hoseini-Tabatabaei and others entitled "A survey on Smartphone Based Systems for Opportunistic User Context Recognition," Centre for Communication Systems Research, University of Surrey, ACM computing surveys, 29 Jun. 2013, or to the article by Ricco Rakotomalala entitled "Arbres de Décision" (Decision Trees), Revue MODULAD, 2005, number 33, pages 163-187.

Briefly, a decision tree comprises nodes, interconnected by branches ending in leaves.

Each node is associated with a test on an attribute, and each leaf corresponds to a reference scene belonging to a corpus or set of reference scenes capable of being detected by the apparatus at the end of the tree traversal.

There may be multiple nodes in the tree associated with the same test on the same attribute.

The nodes are connected by the branches and the choice of a branch from among those starting from a node depends on the value of the attribute in this node and therefore the result of the test in this node.

A decision tree is constructed for a given corpus of scenes by a conventional learning algorithm.

One advantage of scene detection by a decision tree lies in the speed of execution.

In the French patent application filed under No 1752947, the reliability of the classification obtained at the output of a decision tree implemented within an apparatus, whether connected or not connected, for example, but not restrictively a wireless communication apparatus, a smart watch, or a motionless object, has been improved by developing a probability or confidence index associated with each detected scene.

Briefly, this prior patent application notably provided for an acquisition of current values of attributes based on measurement values supplied by sensors and a traversal of a path within a decision tree the nodes of which are associated with tests on these attributes taking into account at each node of the path the current value of the corresponding attribute so as to obtain at the output of the path a scene from among the set of reference scenes, the obtained scene forming the detected scene.

The development of the confidence index associated with the detected scene is performed after the detection of the detected scene and based on the knowledge of this detected scene, in particular by passing along an additional traversal of the path with the knowledge at each node, of the detected scene.

Other classification algorithms or classifiers, different from decision trees, and well known to the person skilled in the art, exist for detecting scenes. Notably this might be an algorithm of the neural network type known to the person skilled in the art who may, for example, refer for all useful purposes to the work by Martin T Hagan and Howard B Demuth entitled Neural Network Design (2nd Edition), 1st September 2014 or an algorithm known to the person skilled in the art under the term GMM ("Gaussian Mixture Model"), the person skilled in the art being able, for example, to refer for all useful purposes to the tutorial slides of Andrew Moore entitled "Clustering with Gaussian Mixtures" available on the Internet site https://www.autonlab.org/tutorials/gmm.html.

These two algorithms are also configured for delivering a confidence probability for each detected scene.

An algorithm of the meta classification algorithm or "meta classifier" type may also be cited as a classification algorithm, i.e., an algorithm that is located on a higher layer than that containing several classification algorithms. Each classification algorithm supplies a decision with respect to a detected scene and the meta classifier compiles the decisions supplied by the different classification algorithms, for delivering a final decision, e.g., by means of a majority vote or a mean.

Unfortunately all types of classification algorithms can sometimes deliver wrong decisions regarding the detected scenes.

Meta classifiers are certainly more efficient but nevertheless remain subject to possible errors in detection. Moreover, they are more complicated to implement, in particular in terms of memory size, and require more complex learning phases.

Embodiments of the invention further improve the reliability of the decisions supplied by a classification algorithm, regardless of its type, and/or to have a better view of their reliability in order to be able to refine this decision at the level of a higher software layer, for example, in a way that is simple to implement.

One or more embodiments relate to the real-time detection of a scene by an apparatus, notably but not exclusively a wireless communication apparatus, e.g. an intelligent mobile cellular phone (smartphone) or a digital tablet, provided with at least one sensor e.g. an accelerometer, and more particularly the filtering of initially detected scenes.

According to one implementation and embodiment, provision is made to use the time correlation between two consecutive decisions for constructing a filter, which may be likened to a "meta filter," which will operate on the successive decisions delivered by the classification algorithm, regardless of its type and including a meta classifier.

According to one aspect, a method is provided for monitoring scene detection by an apparatus detecting scenes from among a set of possible reference scenes.

The method includes an assignment of an identifier to each reference scene.

The method also includes scene detection at successive instants of detection with the aid of at least one classification algorithm. Since each detected scene is one of the reference scenes, it is assigned the identifier of the corresponding reference scene.

The method further includes a sliding time filtering processing of these detected current scenes over a filtering window of size M, based on the identifier of each new detected current scene taken into account in the window and a confidence probability associated with this new detected current scene, the output of the filtering processing successively delivering filtered detected scenes.

Thus, unlike conventional digital filters that operate on digital samples of a signal to be filtered, the filtering processing provided here simply operates on M identifier and probability values associated with the detected scenes.

The implementation of the filter is accordingly simple and inexpensive in memory, e.g., of the order of a kilobit compared with approximately 40 kilobits for an implementation of a Random Forest meta classifier supervising 5 decision trees.

Moreover, the error rate of such a Random Forest meta classifier supervising 5 decision trees is of the order of 5% while the filtering provided leads, for example, to an error rate of the order of 2%. These figures are non-limiting and given as a guide and evaluated on the samples that have been used to drive the classification algorithm.

The value of M defines the size of the filter and its latency (of the order of M/2) and contributes to its accuracy. The person skilled in the art will know how to determine this value according to the envisaged application and the desired performance.

However, a value of 15 for M, for example, may be a good compromise. Other values are also possible.

The classification algorithm may deliver the confidence probability associated with each initially detected current scene.

However, if the classification algorithm does not deliver the confidence probability associated with each initially detected current scene, then the same confidence probability having an arbitrary value, e.g., the value 1, may be assigned to all the detected current scenes.

As mentioned above, the filtering processing is compatible with any type of classification algorithm.

The classification algorithm may thus be configured for delivering a single detected scene at each instant of detection. This is the case, for example, for a single decision tree, or for a meta classifier configured for finally delivering a single detected scene taken, for example, by using a majority vote, from among the scenes detected by the decision trees that compose it, or for a neural network configured for finally delivering a single detected scene taken from among the scenes associated with the neurons of the output layer.

For a classification algorithm configured for delivering at each instant of detection a single detected scene, a register may be provided, e.g., a shift register, of size M (1×M) for forming the window of size M.

However, the classification algorithm may be configured for delivering a group of several scenes at each instant of detection. This is the case, for example, for a meta classifier in which at each instant of detection the different scenes detected by the different decision trees that compose it will be used, without using the last step of the majority vote, for example.

This may also be the case for a neural network whereof the different scenes and their corresponding confidence probability respectively associated with the different neurons of the output layer are used.

In the case of a classification algorithm configured for delivering a group of D scenes at each instant of detection, for forming the filtering window of size M, a memory device of larger size may be provided, capable of storing a matrix of size D×M (D being the number of rows and M the number of columns).

Thus, according to one implementation, in particular when the classification algorithm delivers a single detected scene at each instant of detection, a storage device is provided including a shift register of size M forming the window of size M, and for each new detected current scene, its identifier and the associated confidence probability, optionally normalized, are stored in the register, the filtering processing is performed using the M identifiers present in the register and their associated confidence probability, optionally normalized, and one of the possible scenes, i.e., one of the reference scenes, is delivered as the filtered detected scene.

When the contents of the register are shifted at each new detected current scene, the identifier that is removed therefrom is the oldest identifier timewise. But the identifier that will be delivered after filtering may be any identifier in the register, e.g., that of the scene that has just been detected or that of a preceding scene.

According to an implementation in which the classification algorithm delivers a group of D detected current scenes, with D greater than 1, at each instant of detection, for each new group of D detected current scenes, the confidence probabilities, optionally normalized, associated with the identifiers of these D detected current scenes, are stored in a storage device forming the window of size M. The filtering processing is performed using the D×M identifiers and their associated confidence probability, optionally normalized, and one of the possible scenes, i.e., one of the reference scenes, is delivered as the filtered detected scene.

The filtering processing may include, in particular when the storage device includes a shift register of size M, a definition of a whole number J greater than or equal to two and less than or equal to the integer part of M/2, and for each identifier present in the register framed by 2J identical identifiers, a comparison of this framed identifier with the 2J framing identifiers, and in case of a non-identity of values a replacement of the framed identifier by one of the framing identifiers, and an assignment to the framing identifier replacing the framed identifier, of a confidence probability, optionally normalized, calculated based on the confidence probabilities, optionally normalized, of the 2J framing identifiers, e.g., the mean of the confidence probabilities, optionally normalized, of the 2J framing identifiers.

This makes it possible to eliminate isolated detection errors, for example.

When the storage device is adapted to a classification algorithm configured for successively delivering groups of D detected scenes, the filtering processing that has just been mentioned above notably for the elimination of isolated errors, is then advantageously applied to the matrix D×M, row by row.

According to one implementation, which is compatible regardless of the configuration of the classification algorithm and therefore regardless of the size of the storage device, the filtering processing includes for each identifier taken into account more than once in the storage device a summation of the confidence probabilities, optionally normalized, which are associated with it. The filtered detected scene then being that whereof the identifier taken into account in the storage device has the highest, optionally normalized, cumulative confidence probability.

According to a possible more developed variant, also compatible regardless of the size of the storage device, making it possible notably to supply an indication of the variability of the filter, the filtering processing includes for each identifier taken into account more than once in the storage device a summation of the confidence probabilities, optionally normalized, which are associated with it, a development of a probability density function of the identifiers centered on the identifier having the highest, optionally normalized, cumulative confidence probability, a calculation of the variance of this function, a calculation of a ratio between the highest, optionally normalized, cumulative confidence probability, and the variance and a comparison of this ratio with a threshold and a selection of the filtered detected scene according to the result of the comparison.

This variant thus makes it possible to assess the degree of confidence of the filter and to take a decision accordingly.

Thus, if the ratio is less than the threshold which may result from a large variance, the degree of confidence is smaller and it may then be decided to deliver as the detected scene at the output of the filter, either the scene which effectively exhibits the highest cumulative confidence probability but assigning it a piece of information characterizing it as "uncertain," or the timewise preceding filtered detected scene.

If, on the contrary, the ratio is greater than or equal to the threshold which may result from a small variance, the degree of confidence is high and it may then be decided to deliver as the detected scene at the output of the filter the scene which effectively exhibits the highest, optionally normalized, cumulative confidence probability.

According to another aspect, an apparatus is provided, including sensors configured for supplying measurement values, a detection module configured for real-time detection of successive scenes at successive instants of detection from among a set of possible reference scenes with the aid of at least one classification algorithm, each reference scene being assigned an identifier, and a filtering module configured for performing a sliding time filtering processing of these detected current scenes over a filtering window of size M, based on the identifier of each new detected current scene taken into account in the window and a confidence probability associated with this new detected current scene, and for successively delivering filtered detected scenes.

According to one embodiment, the classification algorithm is configured for delivering the confidence probability associated with each detected current scene.

As a variant the classification algorithm is not configured for delivering the confidence probability associated with each initially detected current scene, and the filtering module is configured for assigning the same confidence probability having an arbitrary value, to all the detected current scenes.

According to one embodiment in which the classification algorithm is configured for delivering a single detected scene at each instant of detection, the filtering module includes a storage device that includes a shift register of size M forming the window of size M, and is configured, for each new detected current scene, for storing its identifier and its confidence probability, optionally normalized, in the register, for performing the filtering processing using the M identifiers present in the register and their associated confidence probability, optionally normalized, and for delivering one of the reference scenes, as the filtered detected scene.

According to one embodiment, the filtering module is configured, for each identifier present in the register framed by 2J identical identifiers, J being a whole number greater than or equal to two and less than or equal to the integer part of M/2, for performing a comparison of this framed identifier with the 2J framing identifiers, and in case of a non-identity of values, replacing the framed identifier by one of the framing identifiers, and for assigning to the framing identifier replacing the framed identifier, a confidence probability, optionally normalized, calculated based on the confidence probabilities, optionally normalized, of the 2J framing identifiers.

According to one embodiment, the calculated confidence probability is the mean of the confidence probabilities, optionally normalized, of the 2J framing identifiers.

According to one embodiment in which the classification algorithm is configured for delivering a group of D detected current scenes, with D greater than 1, at each instant of detection, the filtering module is configured for storing in a storage device forming the window of size M, for each new group of D detected current scenes, the confidence probabilities, optionally normalized, associated with the identifiers of these D detected current scenes, for performing the filtering processing using the D×M identifiers and their associated confidence probability, optionally normalized, and for delivering one of the reference scenes as the filtered detected scene.

According to one embodiment, the filtering module is configured, for each identifier taken into account more than once in the storage device, for performing a summation of the confidence probabilities, optionally normalized, which are associated with it, the filtered detected scene then being that whereof the identifier contained in the storage device has the highest, optionally normalized, cumulative confidence probability.

According to another possible embodiment, the filtering module is configured, for each identifier taken into account more than once in the register, for performing a summation of the confidence probabilities, optionally normalized, which are associated with it, a development of a probability density function of the identifiers centered on the identifier having the highest, optionally normalized, cumulative confidence probability, a calculation of the variance of this function, a calculation of a ratio between the highest, optionally normalized, cumulative confidence probability, and the variance and a comparison of this ratio with a threshold and a selection of the filtered detected scene according to the result of the comparison.

The sensors may be chosen, for example, from the group formed by an accelerometer, a gyroscope, a magnetometer, an audio sensor, a barometer, a proximity sensor, an optical sensor, a temperature, humidity, or brightness sensor.

This list is, however, not exhaustive.

The apparatus may be, for example, a mobile cellular phone or a digital tablet, or any type of smart object, especially a smart watch, optionally connected to an Internet network.

BRIEF DESCRIPTION OF THE DRAWINGS

Other advantages and features of the invention will appear on examination of the detailed description of implementations and embodiments, in no way restrictive, and the attached drawings in which.

DETAILED DESCRIPTION OF ILLUSTRATIVE EMBODIMENTS

Figure 1:
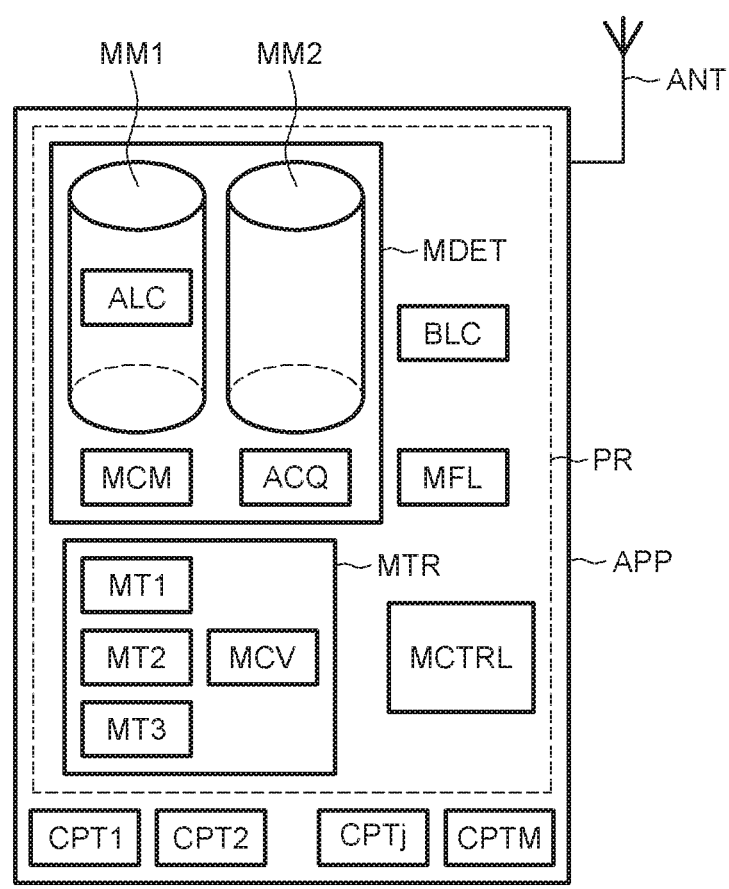
FIGS. 1 to 10 schematically illustrate various implementations and embodiments of the invention.

In FIG. 1, the reference APP designates an electronic apparatus, which will be considered to be in this non-restrictive example, a wireless communication apparatus provided with an antenna ANT. This apparatus may be a mobile cellular phone such as a smartphone or a digital tablet.

The apparatus APP here includes multiple measurement sensors CPT1-CPTj, j=1 to M.

As an example, the sensors CPTj may be chosen from the group formed by an accelerometer, a gyroscope, a magnetometer, an audio sensor such as a microphone a barometer, a proximity sensor, and an optical sensor. Other sensors may also be used.

The apparatus may be provided with multiple accelerometers and/or multiple gyroscopes and/or multiple magnetometers and/or multiple audio sensors and/or a barometer, and/or one or more proximity sensors, and/or one or more optical sensors.

Audio sensors are useful environment descriptors. Indeed, if the apparatus is not moving, then the audio sensor may be useful for detecting the nature of this environment. According to the applications, either environmental sensors of the accelerometer or even gyroscope or magnetometer type may be used, or audio sensors or a combination of these two types of sensor, or other types of sensors, such as non-inertial sensors of the temperature, humidity or brightness type of sensor.

These environmental measurement sensors, may, in particular in a multimodal approach, in combination with a conventional discrimination algorithm ALC, e.g., of the decision tree type, intended to work, for example, on filtered raw data from these sensors, form a detection module MDET configured for detecting a scene. Detection module MDET may thus, for example, detect whether the apparatus APP is located in this or that environment (e.g., restaurant, moving vehicle, etc.) or if the bearer of this apparatus (e.g., a smart watch) is performing a specific activity (e.g., walking, running, cycling, etc.).

It is now assumed as a non-restrictive example that all the environmental sensors CPT1-CPTM help in the detection of the scene and supply the discrimination algorithm ALC with data at measurement instants for making it possible to detect the scene.

As will be seen in more detail below, monitoring the scene detection of scenes obtained from a classification algorithm uses a filtering processing on identifiers of these scenes and uses confidence probabilities associated with these detected scenes. This filtering processing is implemented in filtering module MFL.

A non-restrictive example of a classification algorithm supplying a confidence probability for each detected scene will now be described. Such an algorithm is, for example, described in the French patent application filed under No 1752947 some features of which are recalled here.

The discrimination algorithm implemented in software in the scene detection module MDET here is a decision tree that has undergone a learning phase on an environmental sensor measurement database. Such a decision tree, is particularly simple to implement and only requires a few kilobytes of memory and a working frequency of less than 0.01 MHz.

The decision tree is stored in a program memory MM1.

As will be seen in more detail below, and as is conventional in the matter, the decision tree ALC operates on an attributes vector Ai. The tree includes a series of nodes. Each node is assigned to a test on an attribute.

Two branches emerge from a node.

The choice between the two branches depends on the current value of the attribute associated with this node and therefore the result of the associated test.

Moreover, the output of the tree includes leaves corresponding to reference scenes that the apparatus APP is intended to detect.

These reference scenes may be, for example, without this being restrictive, "BUS," "OFFICE," "RESTAURANT," "TRAIN," scenes representative, for example, of the environment in which the apparatus APP is located, here the phone.

The detection module MDET also includes acquisition module ACQ configured for acquiring current values of the attributes based on the measurement data from the sensors.

In general, an attribute may be an item of raw data from a sensor or an item of filtered raw data, or yet another variable e.g., a data mean over a certain time interval, a variance, etc.

As will be seen in more detail below, the detection module is configured for real-time detection of at least one scene from among the set or corpus of possible reference scenes.

In this respect, the detection module MDET includes control module MCM configured for activating the software module ALC with the current values of the attributes so as to traverse a path within the decision tree and obtain at the output of the path a scene from among the reference scene set, this obtained scene forming the detected scene.

Moreover, the apparatus also includes processor MTR configured for developing a confidence index associated with the detected scene.

And, as will be seen in more detail below, the processing module MTR is configured for developing the confidence index once the scene has been detected and based on the knowledge of this detected scene.

This confidence index will notably be developed from a set of probabilities contained in a memory MM2 of the detection module MDET.

The apparatus APP also includes a module BLC capable of cooperating with the detection module MDET for processing the detected scene and transmitting the information via the antenna ANT of the apparatus. The antenna is optional if the apparatus is not a connected apparatus.

The apparatus also includes control module MCTRL configured for successively activating the detection module MDET so as to implement a succession of scene detection steps spaced apart by time intervals.

These various modules BLC, MDET, MCTRL, MTR and MFL may be implemented, for example, at least in part, by software modules within a microcontroller PR of the apparatus APP, e.g., the microcontroller marketed by STMicroelectronics under reference STM32.

Figure 2:
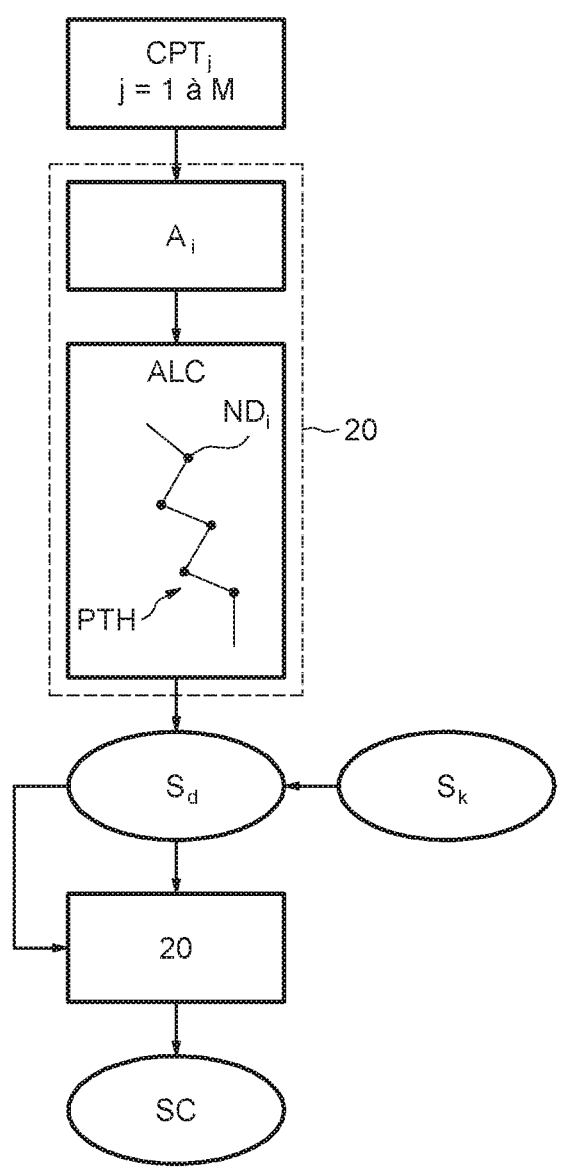

Reference will now be made more particularly to FIG. 2 and following for illustrating an example of confidence index associated with a detected scene.

In FIG. 2, it is assumed that the acquisition module ACQ have delivered from the M sensors CPTj, j=1 to M, an attributes vector Ai having current values.

The number of attributes Ai is independent of the number of sensors.

The control module MCM then activate the software module ALC forming the decision tree with the current values of the attributes Ai so as to traverse a path PTH within this decision tree and obtain at the output of the path a detected scene Sd from among the corpus of reference scenes Sk.

A test is assigned in the path PTH on an attribute Ai at each node NDi. This test is, for example, the operator "less than," or "less than or equal to," or "greater than," or "greater than or equal to," or "equal to."

Once this scene Sd is detected, the control module MCM is configured for activating the decision tree ALC a second time with the current values of the attributes Ai and making it traverse the path PTH a second time.

The processing module MTR includes a first processing module MT1 configured, at each node NDi of the path, for determining a first probability P (Ai|Sd) that the corresponding attribute Ai has the current value knowing the detected scene Sd.

Moreover, this first processing module, for each reference scene Sk different from the detected scene Sd (k=0 to N−1, if it is assumed that there are N reference scenes), will determine a second probability P (Ai|Sk) that the corresponding attribute Ai has the current value knowing this reference scene Sk.

In fact, as will be explained in more detail below, these different first and second probabilities are already stored in the memory MM2 since they have been calculated during an initial phase using histograms for the different possible values of attributes.

Determining these probabilities therefore comes down here to a simple memory read.

The second processing module MT2 of the processing module MTR will then determine an initial confidence index based on all the first and second probabilities.

Finally, a third processing module MT3 may be configured for developing the confidence index based on this initial confidence index.

More precisely, this confidence index SC may be the initial confidence index or, for example, the normalized initial confidence index via the length of the path PTH.

By way of example, the confidence index SC associated with the detected scene Sd may be determined by Formula (I) given by:

$$SC = \sum_{i \in PTH} \log\left(\frac{P_{(A_i|S_d)}}{\frac{1}{N-1} \cdot \sum_{k=0, \neq d}^{N-1} P_{(A_i|S_k)}}\right) \quad (I)$$

where "log" designates the base 10 logarithm function. However, the use of a natural logarithm is possible.

As a variant, the confidence index SC may be determined by Formula (II) given by:

$$SC = \sum_{i \in PTH} \log\left(\frac{P_{(A_i|S_d)}}{\max_{k \neq d}(P_{(A_i|S_k)})}\right) \quad (II)$$

where "max" designates the maximum.

As a variant, it would be possible to determine the confidence index SC from Formula (III) given by:

$$SC = \sum_{i \in PTH} w_i \log\left(\frac{P(A_i|S_d)}{\frac{1}{N-1} \cdot \sum_{k=0, \neq d}^{N-1} P_{(A_i|S_k)}}\right) \quad (III)$$

where $w_i$ are weighting coefficients chosen to give more weight to the logarithms associated with the first nodes of the path PTH. Each weighting coefficient $w_i$ is, for example, positive.

Thus, the weighting coefficient $w_i$ associated with a current node NDi may be equal to the square root of the weighting coefficient $w_{i-1}$ associated with the preceding node if the initial coefficient is greater than 1.

The first weighting coefficient may, for example, be equal to 1.6.

As a variant, the weighting coefficient associated with a current node of rank i may be nearly equal to $\alpha i$, where $\alpha$ is a positive coefficient, and less than 1, e.g., equal to 0.9.

The weighting is then exponentially decreasing.

The SC score forms a confidence index associated with the detected scene Sd.

Indeed, the lower the value of the score (the greater the absolute value of the value for negative values or the lower the absolute value of the value for positive values), the lower the confidence, i.e., the reliability, of detection is. In other words, there is a strong chance that the detected scene does not correspond to the scene in which the apparatus is actually located. Conversely, the higher the score, the higher the confidence, i.e., the reliability, of scene detection is, i.e., there is a strong chance that the detected scene is actually the correct one.

As an example, the values of the score may, for example, vary between −20 and +20.

However, the modules may further include conversion module MCV, for example, also implemented in software form, configured for converting the confidence index SC into a confidence probability with the aid of a conversion function stored in the memory MM2, for example.

Figure 3:
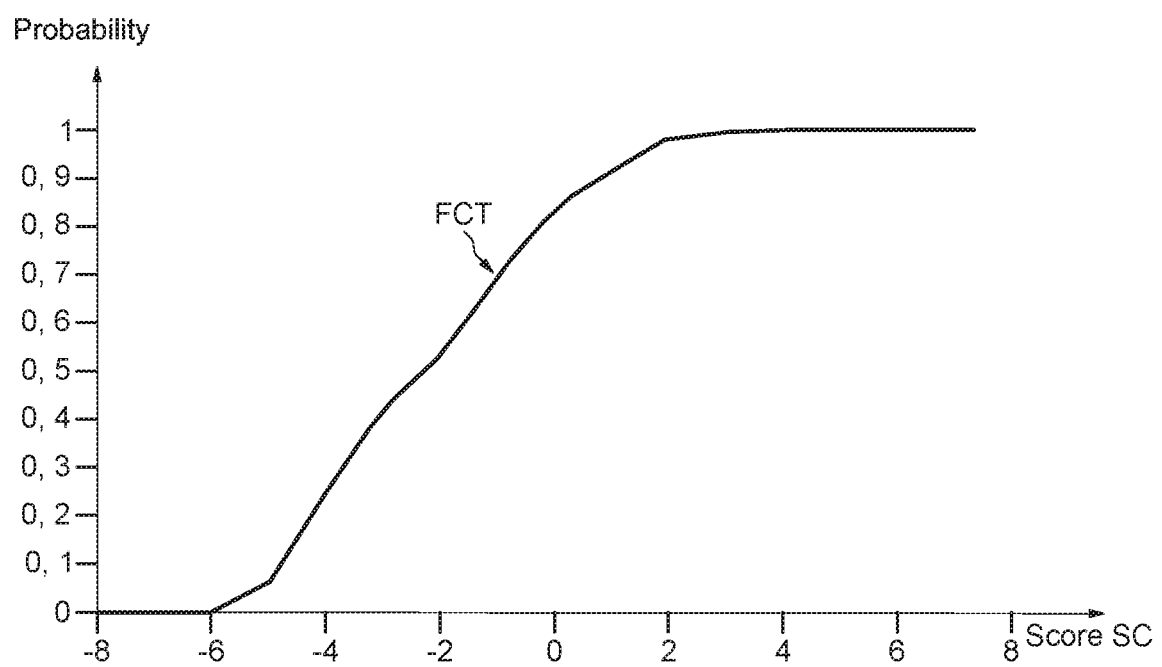

One example of such a conversion function FCT is, for example, illustrated in FIG. 3.

In the illustrated example, the function FCT has a form of a sigmoid and includes scores between −8 and +8 in the abscissa.

More details will be given below regarding an example of determining such a transfer function FCT.

Figure 4:
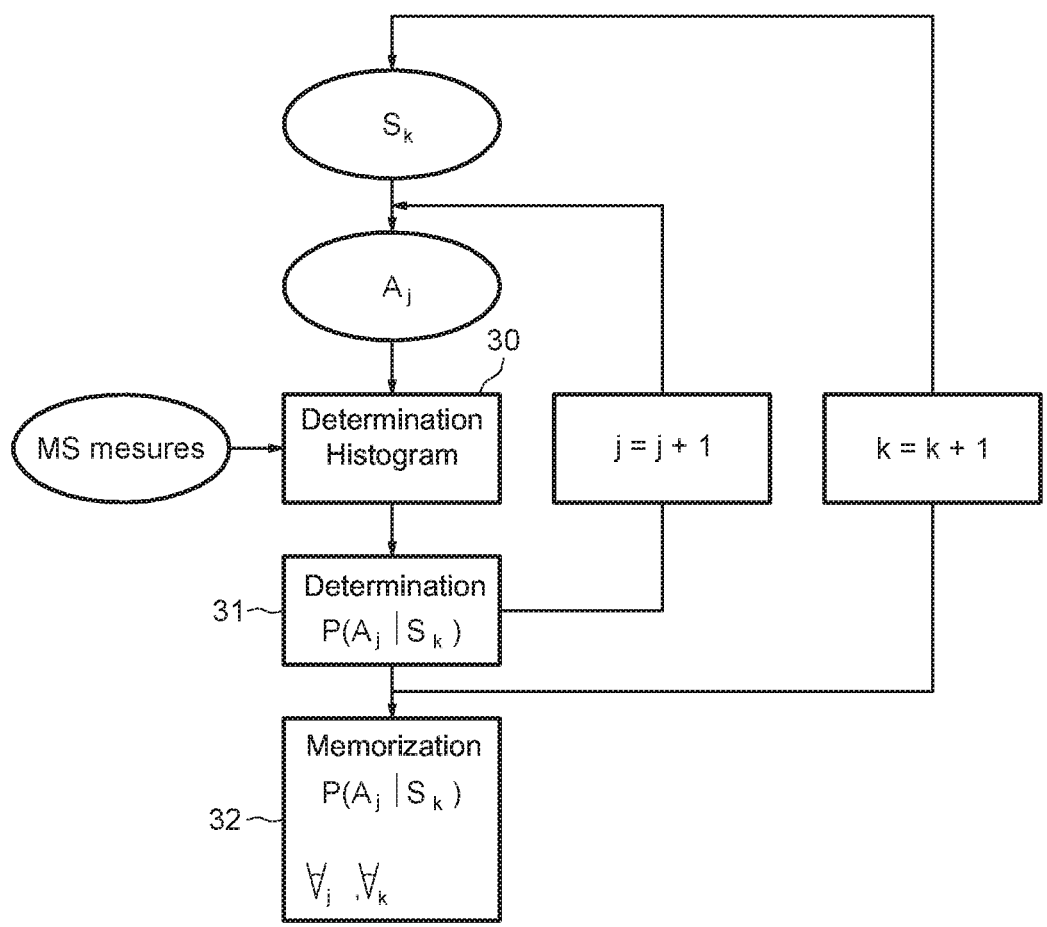

Reference will now be made more particularly to FIG. 4 for illustrating an example of determining probabilities that the attributes have given current values knowing a detected scene.

More precisely, for each scene Sk of the corpus of reference scenes, for each attribute Aj, a number of measurements will be performed, e.g., 100,000 measurements, with different types of apparatus APP provided with different sensors one of which supplies the considered attribute, all of these apparatuses being placed in a condition corresponding to the reference scene at different places on the planet.

For example, if the scene Sk is a "BUS" scene the different apparatuses will be placed in BUSes and the different values will be studied of the attribute Aj supplied by the corresponding sensor or sensors with which the different apparatuses APP are provided.

The MS measurements (MS=100,000, for example) having supplied for the attribute Aj, MS current values, make it possible to determine a histogram for these values (step 30). Based on this histogram, knowing the number MS and the number of times that a current value belongs to a given time interval (corresponding to a given granularity), it is therefore possible to determine (step 31) the probability P (Aj|Sk) that the attribute Aj has this current value knowing the scene Sk.

These operations are repeated for all the attributes Aj and for all the reference scenes Sk belonging to the reference scene corpus and the set of probabilities is then stored (step 32) in the memory MM2.

The first processing module, at each node NDi of the path PTH of the decision tree, may therefore easily read the probability that the considered attribute has the current value associated with this node knowing the detected scene Sd, and also read the probability that the considered attribute has the current value associated with this node knowing a scene Sk different from the scene Sd.

Figure 5:
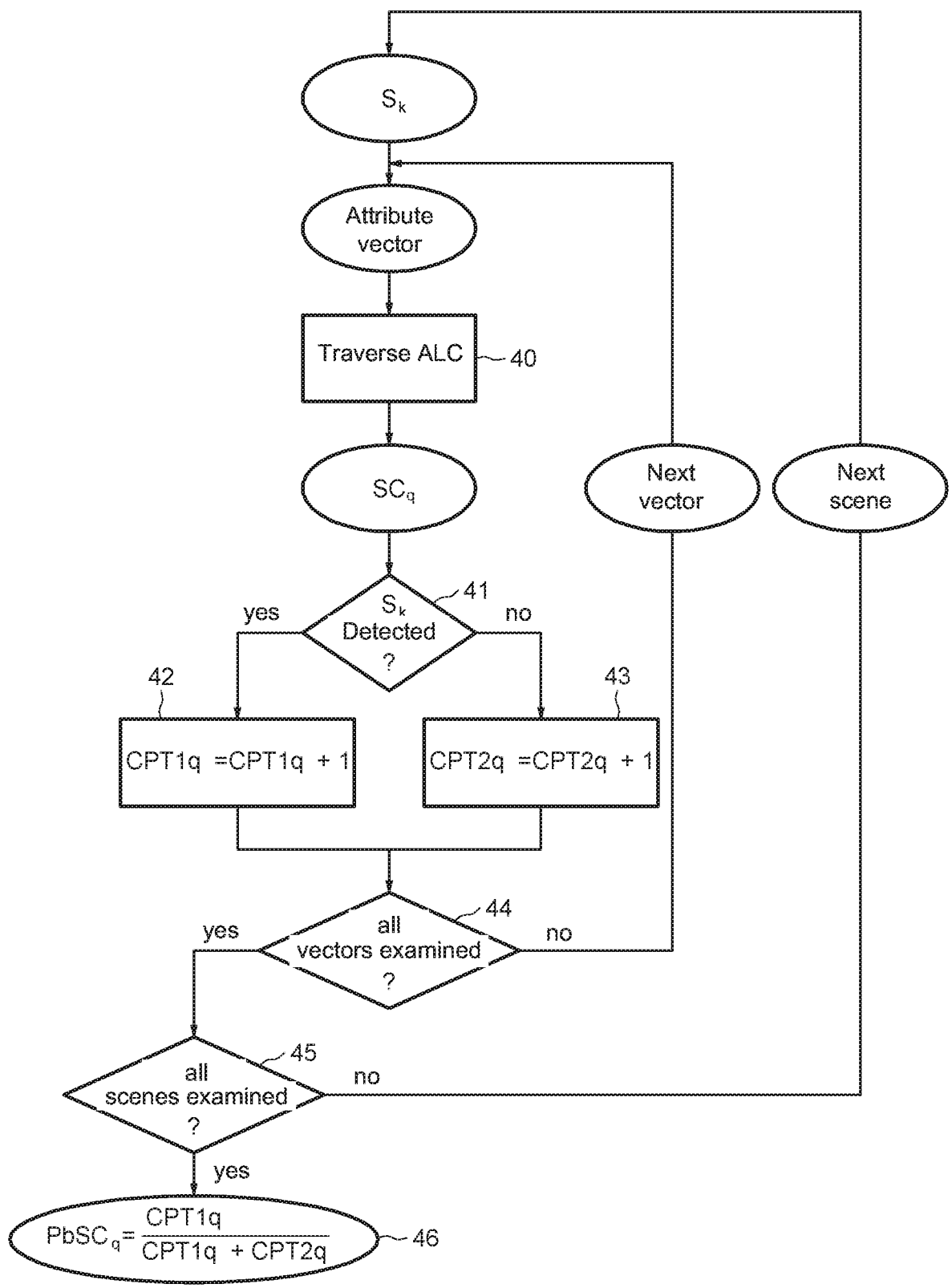

Reference will now be made more particularly to FIG. 5 for describing an example of obtaining the transfer function FCT making it possible to convert the scores SC into a confidence probability.

It is assumed in this example that all the scores SC vary between −8 and +8 and a granularity is defined equal, for example, to 0.5.

In other words, any score value greater than or equal to q and less than q+0.5 will be assigned an arbitrary score value SCq equal to q.

Moreover, a first counter CPT1$q$ and a second counter CPT2$q$ are assigned to each value SCq, the meaning of which will be returned to in more detail below.

It was seen previously that a number of measurements were performed for determining the different probabilities of the attribute values knowing particular scenes.

Accordingly, it is assumed here that a number, e.g., 100,000, of attributes vectors have been obtained corresponding to the different reference scenes of the scene corpus.

Among these 100,000 attributes vectors, there may be, for example, a first number corresponding to a first reference scene, a second number corresponding to a second reference scene, and so on.

As illustrated in FIG. 5, as an example but not restrictively, all the attributes vectors may be examined corresponding to a given reference scene Sk, then all the attributes vectors corresponding to another reference scene may be examined, and so on.

As a variant, it would be possible to examine these attributes vectors in another order even if it means interleaving them.

In the present case, the decision tree ALC is traversed (step 40) with a first attributes vector corresponding to the reference scene Sk and thus a score SCq is obtained that could be calculated according to one of Formulas (I), (II) or (III) previously mentioned.

In step 41 it is then examined whether the scene that was detected at the output of the tree ALC actually corresponds to the scene Sk.

If such is the case, the counter CPT1$q$ is incremented (step 42).

Otherwise, the counter CPT2$q$ is incremented (step 43).

Then, these operations 40, 41, 42 and 43 are repeated for each other attributes vector associated with the reference scene Sk.

When all the attributes vectors have been examined (step 44) the next reference scene is considered and the operations 40, 41, 42, 43, 44 are repeated, until all the reference scenes have been examined (step 45).

Once all the reference scenes have been examined, i.e., all the attributes vectors have been considered, it is then possible to determine for each score SCq the confidence probability PbSCq equal to the ratio between the value of the counter CPT1$q$ and the sum of the values of the two counters, CPT1$q$ and CPT2$q$ (step 46).

The probability values between the different discrete values PbSCq may then be obtained, for example, by an interpolation, in particular a linear interpolation.

A description will now be given in more detail, referring to FIGS. 6 to 10, of the filtering processing implemented within the filtering module MFL on the scenes detected by the classification algorithm.

As mentioned above this filtering processing is compatible with any type of classification algorithm, whether this is, for example, the one that has just been described, or an algorithm of the neural network type or an algorithm known to the person skilled in the art under the term GMM ("Gaussian Mixture Model"), or even a meta classifier.

When the classification algorithm supplies the confidence probabilities associated with the detected scenes, as is the case for the algorithm that has just been described, or an algorithm of the neural network type or even a GMM algorithm, they are used in the filtering processing.

If the classification algorithm does not deliver a confidence probability associated with each detected current scene, the filtering module assigns the same confidence probability having an arbitrary value, e.g., the value 1, to all the detected current scenes.

It is now assumed with reference to FIGS. 6 to 9 that the classification algorithm is of the type configured for detecting a single scene at each instant of detection.

The filtering processing 60 (FIG. 6) is a sliding time filtering processing of the detected scenes over a filtering window of size M based on the identifier of each new detected current scene taken into account in the window and the confidence probability associated with this new detected current scene.

The output of the filtering processing successively delivers filtered detected scenes.

Figures 6, 7:
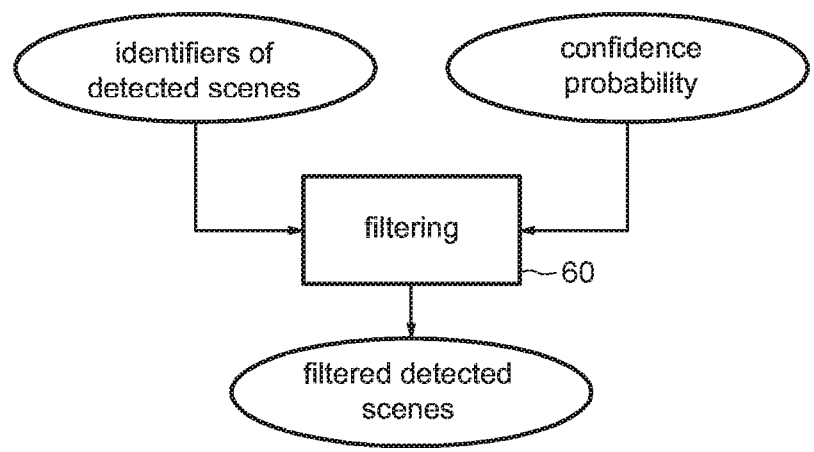

In this regard, as illustrated in FIG. 7, an identifier is assigned to each reference scene.

It is assumed here that there are four reference scenes, namely the "BUS," "RESTAURANT," "OFFICE" and "TRAIN" scenes.

In the example illustrated in FIG. 7, the identifier 1 is assigned to the "BUS" reference scene. The identifier 2 is assigned to the "RESTAURANT" reference scene. The identifier 3 is assigned to the "OFFICE" reference scene. The identifier 4 is assigned to the "TRAIN" reference scene.

Accordingly, since each detected scene belongs to one of the reference scenes, the identifier of the detected current scene is an identifier having one of the values 1, 2, 3 or 4.

Figure 8:
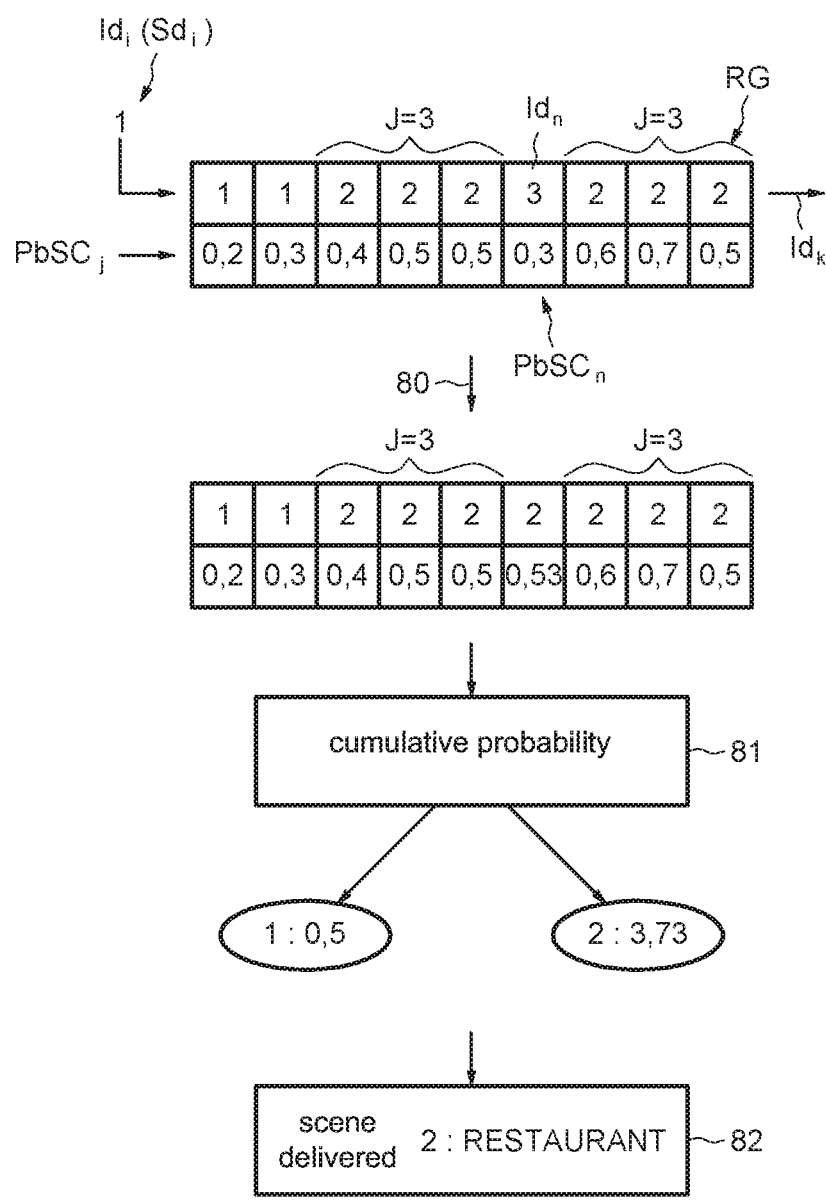

As illustrated in FIG. 8, a shift register RG of size M is provided within the filtering module.

In the example described in FIG. 8, M is taken as equal to 9 for simplification purposes. In practice, M could be larger, e.g., of the order of 15.

The value of M, which notably defines the latency of the filter, may be defined by the person skilled in the art according to the envisaged application.

For each new current scene detected by the classification algorithm, the contents of the register RG are shifted and the identifier of the new detected current scene is stored in the register as well as its associated confidence probability.

More precisely, in the example illustrated here, the new detected scene $Sd_i$ has the identifier $Id_i$ equal to 1 and which is therefore stored in the left-hand box of the register RG. The identifier that was stored in the last box (on the right) of the registry, namely the identifier $Id_k$ is removed from the register.

But, this identifier $Id_k$ is not necessarily the identifier of the filtered scene resulting from the filtering processing, as will now be described.

The register RG, therefore, includes the identifiers of the current scene $Sd_i$ and the eight identifiers of the timewise preceding scenes.

Moreover, the confidence probabilities $PbSC_j$ are associated with these identifiers.

In a first variant, the filtering processing may make it possible to detect and delete isolated errors as is the case illustrated in FIG. 8.

In this regard, a whole number J is defined greater than or equal to 2 and less than or equal to the integer part of M/2. In the present case, J is equal to 3. And, for each identifier present in the register framed by 2J identical identifiers (here the identifier $Id_n$), i.e., J identical identifiers to the left of the framed identifier $Id_n$ and J identical identifiers to the right of the framed identifier $Id_n$, this identifier $Id_n$ is compared with the 2J framing identifiers, in the present case here the three identifiers to the left of $Id_n$ and the three identifiers to the right of $Id_n$, all equal to 2.

And in case of non-identity of values, which is the case here since the identifier $Id_n$ is equal to 3 and the 2J framing identifiers are equal to 2, the identifier $Id_n$ is replaced by one of the framing identifiers, in the present case the identifier 2 (step 80).

Indeed, since the identifier $Id_n$ equal to 3 is isolated among the set of identifiers having the value 2 which frame it, it may be considered that it is an isolated error here and the identifier $Id_n$ is replaced by one of the framing identifiers.

For reasons of clarity, this replacement has been described regarding the contents of the register illustrated in FIG. 8. However, in practice, this filtering is advantageously performed at each arrival of a new identifier. In the example of FIG. 8, upon the arrival of the last "2" (which is the left-most in the figure), the filtering will be performed, and the "3" will be replaced. In other words, on each new identifier entering, it is looked at to see whether the $(J+1)^{th}$ timewise preceding identifier can be replaced for clearing the filter as soon as possible.

Then in this example the two identifiers "1" will be retrieved, taking into account this replacement step 80, with the contents of the register RG therefore equal to 112222222.

Moreover, a confidence probability was assigned to the identifier 2, which is here substituted for the identifier 3 in the sixth place of the register.

By way of example, the mean of the confidence probabilities of the 2J framing identifiers, i.e., here of the six identifiers having the value 2, may be derived so as to obtain, for the identifier 2 located in the sixth place which has replaced the identifier $Id_n$ 3, the confidence probability equal here to 0.53.

As a variant, it would also be possible to normalize these confidence probabilities, i.e., to divide each confidence probability by the sum of all the confidence probabilities of the identifiers stored in the register RG.

Then, for each identifier present more than once in the register, the confidence probabilities are summed, possibly normalized, which are associated with it (step 81).

Of course, step 80, although particularly advantageous, is in no way mandatory and could be omitted, step 81 then being performed directly.

In the example described, the identifier 1 is repeated twice, therefore its cumulative confidence probability here is equal to 0.5 (normalization has not been performed here).

The identifier 2, is repeated seven times and its cumulative probability is equal to 3.73 (normalization has not been performed here).

If an identifier is present only once in the register, it retains its confidence probability which is its cumulative probability.

In this variant embodiment, the filtered detected scene delivered by the filtering processing (step 82), may then be that whereof the identifier contained in the registry has the highest, optionally normalized, cumulative confidence probability.

In the present case it is the identifier 2 which corresponds to the "RESTAURANT" scene.

It can therefore be seen that although the current scene that has been detected and that has been introduced into the register RG was the "BUS" scene assigned the identifier 1, the scene delivered by the filtering module remains the "RESTAURANT" scene (identifier 2). Indeed, in the present case, it appears that it is probably in a transition phase between the "RESTAURANT" scene and the "BUS" scene and that it is preferable to wait until the "BUS" scene has stabilized several times in succession before delivering this scene at the output of the filtering module.

Figure 9:
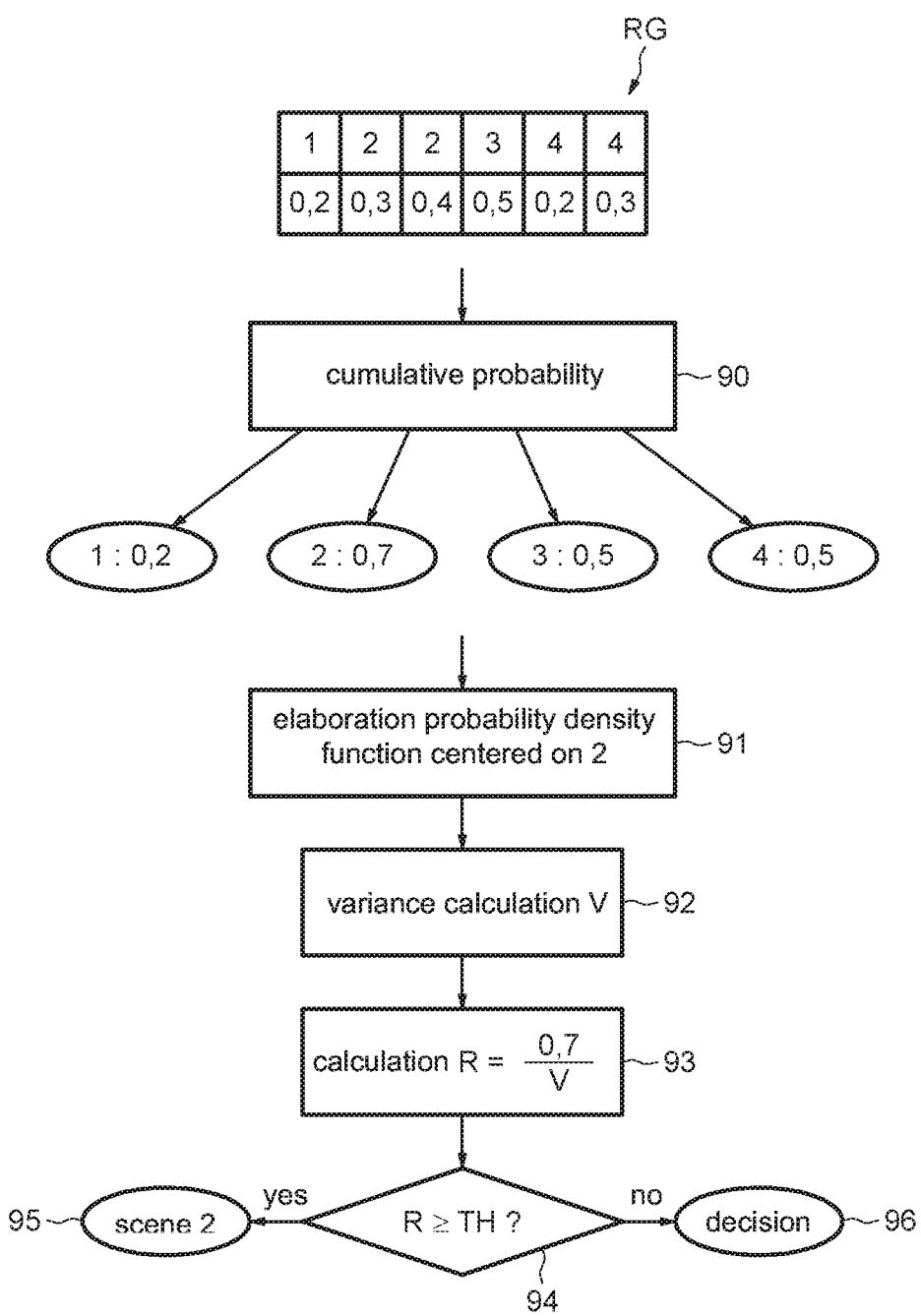

More particular reference is now made to FIG. 9 for illustrating another variant of filtering according to the invention.

In this example, it is assumed that the register RG is capable of storing six identifiers (M=6). These identifiers are, at a current instant, the identifiers 1, 2, 2, 3, 4, 4 respectively assigned confidence probabilities 0.2; 0.3; 0.4; 0.5; 0.2 and 0.3.

It should be noted first of all that in this configuration, no identifier is framed by 2J identical framing identifiers.

Accordingly, the identifiers of the register RG are not modified.

The filtering processing here again provides (step 90) an accumulation of confidence probabilities per identifier.

Thus, the identifier 1, which is alone in the registry, retains its confidence probability equal to 0.2.

On the other hand, the identifier 2, present twice, has a cumulative confidence probability equal to 0.7.

The identifier 3 has a confidence probability equal to 0.5 and the identifier 4 has a cumulative confidence probability equal to 0.5.

As in the previous example, it could be decided to deliver the scene corresponding to the identifier 2 which exhibits the highest cumulative confidence probability.

However, before taking such a decision, a conventional probability density function will advantageously be developed centered on the identifier with the highest cumulative confidence probability, which in the present case is the identifier 2.

This will make it possible to supply an indication of the variability of the filter.

The variance V of this function is then calculated (step 92) and, in step 93, the ratio R is determined between the maximum cumulative confidence probability (in the present case 0.7) and the variance V.

This ratio R (step 94) is then compared with a threshold TH.

The value of this threshold TH is determined empirically based on the attributes vectors corresponding to the different reference scenes of the scene corpus and the corresponding recognition rates in order to find a compromise between limiting false detections and a good reactivity of the filter during scene transitions.

The person skilled in the art will be able to adjust the value of this threshold according to the envisaged application.

However, for normalized confidence probabilities, the value of the threshold is, as an example, chosen between 1 and 5, e.g., 2.5 for a corpus of 5 scenes with a filter size M equal to 10.

If this ratio is greater than or equal to the threshold, which corresponds to a low variance, then it may be considered that the degree of confidence in the decision is high and the scene 2 that exhibits the highest cumulative confidence probability may effectively be delivered at the output of the filtering module with a high degree of confidence.

On the other hand, if the ratio is less than the threshold, which corresponds to a high variance and therefore to a significant variability of the filter, then it may be decided to deliver this indication of high variability to the higher software layer with a view to taking a decision (step 96).

This decision may then be, for example, to deliver the timewise preceding scene in the register RG or even so to deliver the "RESTAURANT" scene (identifier 2) with a piece of information specifying that the degree of confidence is uncertain.

Figure 10:
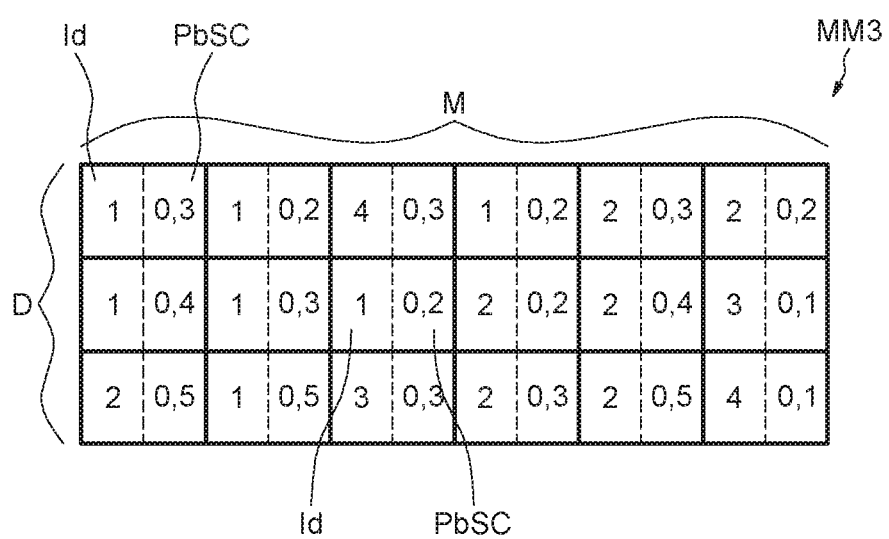

In the case where the classification algorithm is of the type configured for detecting at each instant of detection, D scenes from among the corpus of reference scenes, the filtering module includes, as illustrated in FIG. 10, a storage device MM3 forming the window of size M, in which for each new group of D detected current scenes, the confidence probabilities PbSC, optionally normalized, associated with the identifiers Id of these D detected current scenes, are stored.

The storage configuration illustrated in FIG. 10 is only one example, other storage configurations of the storage device being possible.

The filtering processing is performed using the D×M identifiers Id and their associated confidence probability PbSC and one of the possible scenes, i.e., one of the reference scenes, is delivered as the filtered detected scene.

In such a case, the correction of the isolated errors described above with reference to FIG. 8 (step 80) is advantageously performed row-wise.

On the other hand, the accumulation of confidence probabilities (step 81 in FIG. 8) for any identifier taken into account more than once in the storage device, is implemented on the whole stored table.

The same applies to the development of the centered probabilities function and the calculation of the ratio R.

What is claimed is:

1. A method for monitoring scene detection, the method comprising:
    assigning an identifier to each reference scene of a set of possible reference scenes;
    detecting current scenes from the set of possible reference scenes at successive instants of detection by using a classification algorithm, wherein detecting current scenes comprises associating an identifier to each detected current scene of the current scenes based on the identifiers of the possible reference scenes;
    filtering the detected current scenes using a sliding time filtering process over a filtering window of size M based on the identifier of each detected current scene considered in the filtering window and a confidence probability associated with each detected current scene considered in the filtering window, wherein M is a positive integer;

storing the identifiers associated with each detected current scene and the confidence probability associated with each detected current scene in a shift register of size M, wherein filtering the detected current scenes comprises using the M identifiers associated with each detected current scene stored in the shift register; and successively delivering filtered detected scenes based on the filtering, wherein filtering the detected current scenes comprises:

for each framed identifier present in the shift register framed by 2J identical framing identifiers, comparing the framed identifier with the 2J identical framing identifiers, wherein J is a positive integer greater than or equal to two and less than or equal to M/2, and when the framed identifier is different from the 2J identical framing identifiers, replacing the framed identifier with the an identifier identical to the 2J identical framing identifiers, calculating a confidence probability based on the confidence probabilities of 2J identical framing identifiers; and assigning to the framed identifier the calculated confidence probability.

2. The method of claim 1, further comprising delivering the confidence probability associated with each detected current scene using the classification algorithm.

3. The method of claim 1, further comprising using the same arbitrary confidence probability for all the detected current scenes when the classification algorithm does not deliver the confidence probability associated with each detected current scene.

4. The method of claim 1, further comprising normalizing each confidence probability associated with each detected current scene.

5. The method of claim 1, wherein filtering the detected current scenes further comprises, for each identifier taken into account more than once in the shift register, performing a summation of the confidence probabilities associated with each identifier taken into account more than once to generate a respective cumulative confidence probability.

6. The method of claim 5, wherein successively delivering filtered detected scenes comprises delivering a scene contained in the shift register that is associated with the highest cumulative confidence probability.

7. The method of claim 1, wherein calculating the confidence probability comprises determining a mean of the confidence probabilities of the 2J identical framing identifiers.

8. The method of claim 1, further comprising:
receiving groups of D detected current scenes from the classification algorithm, wherein D is a positive integer greater than 1; and
storing identifiers and confidence probabilities associated with each detected current scene of the group of D detected current scenes in a storage device forming the filtering window of size M, wherein filtering the detected current scenes comprises using the DxM identifiers and associated confidence probabilities.

9. A method for monitoring scene detection, the method comprising:
assigning an identifier to each reference scene of a set of possible reference scenes;
detecting current scenes from the set of possible reference scenes at successive instants of detection by using a classification algorithm, wherein detecting current scenes comprises associating an identifier to each detected current scene of the current scenes based on the identifiers of the possible reference scenes;
filtering the detected current scenes using a sliding time filtering process over a filtering window of size M based on the identifier of each detected current scene considered in the filtering window and a confidence probability associated with each detected current scene considered in the filtering window, wherein M is a positive integer;
storing the identifiers associated with each detected current scene and the confidence probability associated with each detected current scene in a shift register of size M, wherein filtering the detected current scenes comprises using the M identifiers associated with each detected current scene stored in the shift register; and
successively delivering filtered detected scenes based on the filtering, wherein filtering the detected current scenes further comprises:
for each identifier taken into account more than once in the shift register, performing a summation of the confidence probabilities associated with each identifier taken into account more than once to generate a respective cumulative confidence probability,
generating a probability density function of the identifiers centered on the identifier having the highest cumulative confidence probability,
calculating a variance of the generated probability density function,
calculating a ratio between the highest cumulative confidence probability and the variance,
comparing the ratio with a threshold, and
selecting the filtered detected scene based on a result of the comparing.

10. The method of claim 9, wherein successively delivering filtered detected scenes comprises delivering a scene contained in the shift register that is associated with the highest cumulative confidence probability.

11. An apparatus comprising:
a plurality of sensors configured for supplying measurement values; and
a controller configured to:
perform real-time detection of successive current scenes at successive instants of detection from among a set of possible reference scenes by using a classification algorithm, each reference scene being assigned an identifier, and
perform a sliding time filtering processing of the detected current scenes over a filtering window of size M based on the identifier of each new detected current scene taken into account in the window and a confidence probability associated with each new detected current scene, and to successively deliver filtered detected scenes, wherein M is a positive integer, wherein the classification algorithm is configured for delivering a single detected scene at each instant of detection, and wherein the controller comprises a storage device comprising a shift register of size M forming the window of size M, the controller further configured to:
for each new detected current scene,
store each identifier and confidence probability associated with each new detected current scene in the shift register,
perform the filtering processing using the M identifiers present in the shift register and their associated confidence probability, and deliver one of the reference scenes as the filtered detected scene, and for each identifier taken into account more than once in the storage device,
generate a cumulative confidence probability by performing a summation of the confidence probabilities associated with each identifier present more than once in the storage device,
develop of a probability density function of the identifiers centered on the identifier having the highest cumulative confidence probability,
calculate a variance of the probability density function,
calculate a ratio between the highest cumulative confidence probability and the variance,
compare the ratio with a threshold to generate a result, and
select the filtered detected scene based on the result.

12. The apparatus of claim 11, wherein the classification algorithm is configured for delivering the confidence probability associated with each detected current scene.

13. The apparatus of claim 11, wherein the classification algorithm is not configured for delivering the confidence probability associated with each detected current scene, and the controller is configured for assigning the same arbitrary confidence probability to all the detected current scenes.

14. The apparatus of claim 11, wherein the controller is further configured to normalize each confidence probability associated with each new detected current scene.

15. The apparatus of claim 11, wherein the controller is configured, for each identifier present more than once in the storage device, to generate a cumulative confidence probability by performing a summation of the confidence probabilities associated with each identifier present more than once in the storage device, the filtered detected scene then being a scene associated with the identifier contained in the storage device has the highest cumulative confidence probability.

16. The apparatus of claim 11, wherein the controller is a microcontroller.

17. An apparatus comprising:
a plurality of sensors configured for supplying measurement values; and
a controller configured to:
perform real-time detection of successive current scenes at successive instants of detection from among a set of possible reference scenes by using a classification algorithm, each reference scene being assigned an identifier, and
perform a sliding time filtering processing of the detected current scenes over a filtering window of size M based on the identifier of each new detected current scene taken into account in the window and a confidence probability associated with each new detected current scene, and to successively deliver filtered detected scenes, wherein M is a positive integer, wherein the classification algorithm is configured for delivering a single detected scene at each instant of detection, and wherein the controller comprises a storage device comprising a shift register of size M forming the window of size M, the controller further configured to:
for each new detected current scene,
store each identifier and confidence probability associated with each new detected current scene in the shift register,
perform the filtering processing using the M identifiers present in the shift register and their associated confidence probability, and
deliver one of the reference scenes as the filtered detected scene, and
for each framed identifier present in the shift register framed by 2J identical framing identifiers, J being a whole number greater than or equal to two and less than or equal to the integer part of M/2, perform a comparison of the framed identifier with the 2J identical framing identifiers, and when the framed identifier is different from the 2J identical framing identifiers, replace the framed identifier by one of the 2J identical framing identifiers, and assign to the framing identifier replacing the framed identifier a confidence probability calculated based on the confidence probabilities of the 2J framing identifiers.

18. The Apparatus of claim 17, wherein the calculated confidence probability is the mean of the confidence probabilities of the 2J framing identifiers.

19. The apparatus of claim 11, wherein the classification algorithm is configured for delivering a group of D detected current scenes, with D greater than 1, at each instant of detection, and the controller is configured for storing in a storage device forming the window of size M, for each new group of D detected current scenes, the confidence probabilities associated with the identifiers of the D detected current scenes, for performing the filtering processing using the D×M identifiers and associated confidence probability and for delivering one of the reference scenes as the filtered detected scene.

20. The apparatus of claim 11, wherein the sensors are chosen from a group comprising an accelerometer, a gyroscope, a magnetometer, an audio sensor, a barometer, a proximity sensor, an optical sensor, a temperature sensor, a humidity sensor, and a brightness sensor.

21. The apparatus of claim 11, wherein the apparatus is a mobile cellular phone, a digital tablet, or a smart watch.

22. An apparatus comprising:
means for supplying measurement values;
means for real-time detection of successive current scenes at successive instants of detection from among a set of possible reference scenes by using a classification algorithm, each reference scene being assigned an identifier;
means for performing a sliding time filtering processing of the detected current scenes over a filtering window of size M based on the identifier of each new detected current scene taken into account in the window and a confidence probability associated with each new detected current scene, and for successively delivering filtered detected scenes, wherein M is a positive integer, wherein the classification algorithm is configured for delivering a single detected scene at each instant of detection;
means for storing the identifiers associated with each detected current scene and the confidence probability associated with each detected current scene, the means for storing the identifiers comprising a shift register of size M forming the window of size M; and
means for:
for each new detected current scene,
storing each identifier and confidence probability associated with each new detected current scene in the shift register, performing the filtering processing using the M identifiers present in the shift register and their associated confidence probability, and delivering one of the reference scenes as the filtered detected scene, and for each framed identifier present in the shift register framed by 2J identical framing identifiers, J being a whole number greater than or equal to two and less than or equal to the integer part of M/2, performing a comparison of the framed identifier with the 2J identical framing identifiers, and when the framed identifier is different from the 2J identical framing identifiers, replacing the framed identifier by one of the 2J identical framing identifiers, and assigning to the framing identifier replacing the framed identifier a confidence probability calculated based on the confidence probabilities of the 2J framing identifiers.

23. The apparatus of claim 22, further comprising means for:

for each identifier taken into account more than once in the means for storing, generating a cumulative confidence probability by performing a summation of the confidence probabilities associated with each identifier present more than once in the means for storing;

developing of a probability density function of the identifiers centered on the identifier having the highest cumulative confidence probability;

calculating a variance of the probability density function;

calculating a ratio between the highest cumulative confidence probability and the variance;

comparing the ratio with a threshold to generate a result; and selecting the filtered detected scene based on the result.

24. The apparatus of claim 23, wherein the calculated confidence probability is the mean of the confidence probabilities of the 2J framing identifiers.

* * * * *